United States Patent [19]

Middleton

[11] Patent Number: 4,715,913

[45] Date of Patent: Dec. 29, 1987

[54] DECORATING SUBSTRATE MATERIALS

[75] Inventor: Nicholas J. Middleton, Highworth, England

[73] Assignee: Metal Box p.l.c., Reading, England

[21] Appl. No.: 858,556

[22] Filed: Apr. 24, 1986

Related U.S. Application Data

[63] Continuation of Ser. No. 619,175, Jun. 11, 1984, abandoned.

[30] Foreign Application Priority Data

Jun. 13, 1984 [GB] United Kingdom ................. 8316092

[51] Int. Cl.[4] ........................ B32B 31/00; B44C 1/17; D06P 1/02

[52] U.S. Cl. ...................................... 156/85; 156/235; 156/240; 8/468

[58] Field of Search ...................... 8/468, 467; 156/85, 156/84, 235, 238, 240, 239, 230, 241, 233, 249, 289; 428/202, 200, 352, 913, 914

[56] References Cited

U.S. PATENT DOCUMENTS

| | | | |
|---|---|---|---|
| 3,658,617 | 4/1972 | Fearnow et al. | 156/238 |
| 4,436,777 | 3/1984 | Karpiloff | 156/84 |
| 4,465,489 | 8/1984 | Jenkins et al. | 8/471 |
| 4,475,975 | 10/1984 | Talley et al. | 156/240 |
| 4,491,494 | 1/1985 | Davis, Jr. et al. | 156/241 |

FOREIGN PATENT DOCUMENTS

| | | |
|---|---|---|
| 2915555 | 10/1980 | Fed. Rep. of Germany . |
| 2084931 | 4/1982 | United Kingdom . |

*Primary Examiner*—Donald E. Czaja
*Assistant Examiner*—Louis Falasco
*Attorney, Agent, or Firm*—Diller, Ramik & Wight

[57] ABSTRACT

A method for decorating substrate materials such as flat metal sheet or cylindrical metal containers in which a linear polyester/adhesive laminate film is applied to the substrate either prior to or simultaneously with a flexible dye transfer carrier. Thus, on heating the laminate film bonds to the substrate and dye is transferred from the carrier to the film. After cooling the carrier is removed, leaving a high gloss, finely decorated laminate film/substrate.

26 Claims, No Drawings

DECORATING SUBSTRATE MATERIALShis application is a continuation of application Ser. No. 619,175, filed 6-11-84, now abandoned.

The present invention relates to methods for decorating substrate materials, and in particular to such methods for decorating and protecting the external surface of containers, such as two- or three-piece metal cans, in a single operation.

Whilst the invention is primarily applicable to metal substrate materials, for example, comprising aluminium, tinplate, alloyed tinplate, blackplate, tin free steel or other steel base materials, the invention may also be usefully applied to the decoration of paper, board, wood and glass substrate materials.

U.S. Pat. No. 4,465,489 in the name of Leonard A. Jenkins et al issued Aug. 14, 1984, describes a method of decorating metal containers in which a flexible carrier, printed with indicia in sublimable dye is applied over a coating receptive to such dye on a surface of the container. The carrier is applied to the receptive coating by means of an adhesive and after heating to effect the transfer of the indicia into the coating, the container is allowed to cool and the carrier is removed.

The receptive coating is normally applied (as a liquid) to the container well before the application of the carrier by roller-coating followed by stoving, varnishing and restoving. Thus, to decorate a container according to the method described in application No. 8121726 it may be subjected to three separate heating stages.

In the present invention only one or possibly two heating stages are employed. Further, there is a noticeable improvement in the level of consistency of final substrate finish and appearance when compared with a conventional varnished surface. There is, therefore, a commensurate saving of time, equipment and expense, as well as an improved product when compared with the previous methods.

Thus, the present invention provides a method for decorating a substrate material including the steps of:

(a) applying a laminate film including a layer of a linear polyester and a layer of a heat sensitive adhesive to the surface of the substrate with the adhesive layer in contact with the substrate, prior to or simultaneously with the application of a flexible carrier printed with indicia in a sublimable dye over the laminate film;

(b) heating the assembly so formed at such a temperature and for such a time that the laminate adheres to the surface of the substrate and the carrier shrinks into intimate contact with the laminate and at least some of the dye sublimes so as to transfer the indicia to the laminate; and (c) removing the carrier from the laminate.

Preferably, the substrate material is in the form of a flat metal sheet or container e.g. a cylindrical metal can. When in the form of a container the laminate film is applied to the external surface thereof.

Desirably, the laminate film is bonded to the container simultaneously with the transfer of sublimable dye.

Advantageously, the laminate film comprises two layers, one, the outside polyester layer to receive the sublimable dye and afford protection to the substrate material (against damage during article manufacture, distribution and use), the other acting as an adhesive to bond the outside layer to the substrate material. For further decorative purposes, either of these layers may be coloured or textured and/or additional layers included in the laminate. When the laminate film is to be applied to a substrate that will subsequently be heat treated, e.g. as in pasteurization, the constituent layers must be capable of withstanding such heating.

Preferably, the linear polyester layer comprises polyethylene terephthalate, but there may also be mentioned polyethylene isophthalate and poly butylene terephthalate, and copolymers thereof. Thus, the material has good heat resistance, toughness and clarity. The polyester layer is usually transparent, 2–30 microns and preferably 10–30 microns thick, and in a heat set condition. In the case of polyethylene terephthalate, heat setting is previously carried out at approximately 180° C.

The polyester layer may also be flame pretreated by known methods to improve its bonding capacity.

Preferably, the adhesive layer becomes tacky at temperatures of about 120° C. without degrading, and typically there may be mentioned as sutiable adhesives the polymethacrylates and ethylmethacrylic acid copolymers. Depending on the final appearance of the decorated substrate, the adhesive layer can be clear or pigmented (opaque) to give a white, coloured or metallic background to the decoration. Pressure sensitive adhesives may also be used.

When additional layers are incorporated in the laminate film they are positioned between the polyester layer and the adhesive layer, e.g. a white polymer layer may be used for extra background opacity, a thin metallic layer to give a very even bright background or coloured polymer layers or mixtures may be employed to provide eye-catching optical effects.

Preliminary heat setting of the polyester layer is usually necessary in order to minimize excessive shrinking or buckling during processing. However, some shrinking does occur during heating (approximately 1%), and this is found to be advantageous because it helps to flatten the laminate film against the substrate surface.

The flexible carrier employed is similar to that described in U.S. Pat. No. 4,465,489 and typically comprises a paper label pre-printed with indicia in an ink containing one or more transferable sublimable dyes, e.g. anthraquinone or quinoline based dyes, or disperse acetate dyes. Labels comprising plastic or metal foil are also envisaged.

Heating to effect adhesion of the laminate film to the substrate material and transfer of the sublimable dye is typically in the range 150°–200° C. for 5–90 seconds, depending upon the type of dye and material surfaces involved. Such heating may be carried out in a hot air oven or by induction heating.

In the case of a 360° wrap-around carrier label on a cylindrical substrate, heating to shrink the carrier not only improves the quality of transferred indicia, but assists in producing excellent adhesion between the laminate film and substrate.

Preferably, the carrier is allowed to cool to below the sublimation temperature of the dye before it is removed from the laminate, but this is not essential.

Removal of the carrier from the laminate film may be conveniently achieved as described in the above-mentioned co-pending application.

The invention may be further described by means of the following non-limiting examples:

EXAMPLE I

"Three-Piece" Welded Tin-Plate Container

A laminate film was prepared by applying a polymethacrylic adhesive to a clear 12 microns thick polyethylene terephthalate film by a bar coater/gravure coater to give a dry coating weight of 2–10 gms/m$^2$. The adhesive was dried by hot air.

The laminate was then cut to the size of a container blank with due allowance for a clear weld margin, and bonded to the (clean) blank in a heated press. The temperature of the press was 120° C.–200° C. and the dwell time 15–30 seconds. The laminate blank was then welded in the usual way to form a cylindrical sleeve.

A narrow strip of laminate film was applied to the outer weld region of the cylindrical sleeve with, typically a 3 mm circumferential overlap, of the bonded laminate film. The sleeve was then heated as before while under pressure.

A dye transfer carrier label was completely and firmly wrapped around (360°) the laminated sleeve, overlapped and bonded (along the overlapped portion only) to hold it in position, and the assembly heated to 180° C.–200° C. for two minutes. After removing the label, the laminate was found to be finely decorated with well defined indicia around its full circumference. The decorated laminate film also had a bright gloss appearance and smooth handle. The cylindrical metal/laminate sleeve was then processed by known methods to form a conventional neck, flange and end seams.

EXAMPLE II

Preformed Welded Tin-Plate Container and "Two-Piece" Aluminium Container

A laminate film was prepared as in Example I and cut to the container size with a 3 mm circumferential overlap. The (clean) container was then simultaneously "labelled" with the laminate film and a 360° dye transfer carrier label (applied as in Example I), and the assembly heated to 180° C.–20020 C. for two minutes. This caused the laminate to adhere to the surface of the container and the sublimable indicia to transfer to the laminate from the carrier. After removing the carrier label, the laminate was found to be faithfully decorated with well-defined indicia around its full circumference. The decorated laminate film also had a clean glossy appearance and smooth handle. According to type, the container was finished-off by known methods.

I claim:

1. A method of decorating a side wall of a container body comprising the steps of (a) providing a container body having a side wall including an exterior surface, (b) providing a base coating laminate including a layer of polyester film and a layer of heat-sensitive adhesive, (c) providing a flexible paper carrier printed with indicia in a sublimable dye, (d) first applying the base coating laminate to the container body side wall exterior surface with the adhesive thereof in contact with the container body exterior surface, (e) heating the heat-sensitive adhesive to activate the heat-sensitive adhesive and bond the polyester film of the base coating laminate to the container body, (f) following step (e) applying the flexible paper carrier with the sublimable dye against the layer of the polyester film in such a position as to effect the migration of the dye from the carrier directly to the layer of polyester film, (g) heating the paper carrier in order (1) to effect shrinkage of the paper carrier to tighten it into intimate contact with the polyester, and (2) to effect the migration of the sublimable dye and indicia from the paper carrier to the layer of polyester film, and then (h) removing the paper carrier from the layer of polyester film.

2. A method of decorating a side wall of a container body comprising the steps of (a) providing a container body having a side wall including an exterior surface, (b) providing a base coating laminate including a layer of polyester film and a layer of heat-sensitive adhesive, (c) providing a flexible paper carrier printed with indicia in a sublimable dye, (d) first applying the base coating laminate to the container body side wall exterior surface with the adhesive thereof in contact with the container body exterior surface, (e) following step (d) applying the flexible paper carrier with the sublimable dye against the layer of polyester film in such a position as to effect the migration of the dye from the carrier directly to the layer of polyester film; following step (e), (f) heating the paper carrier in order (1) to effect shrinkage of the paper carrier to tighten it into intimate contact with the polyester film, (2) to effect the migration of the sublimable dye and indicia from the paper carrier to the layer of polyester film and (3) to simultaneously activate the heat-sensitive adhesive to bond the polyester film of the base coating laminate to the container body side wall, and then (g) removing the paper carrier from the layer of polyester film.

3. A method according to claim 1 wherein the container body is made of metallic material.

4. A method according to claim 2 wherein the container body is made of metallic material.

5. A method according to claim 1 wherein the layer of polyester film has a thickness of 2 to 30 microns.

6. A method according to claim 2 wherein the layer of polyester film has a thickness of 2 to 30 microns.

7. A method according to claim 1 wherein in the base coating laminate either the layer of polyester film or the layer of heat-sensitive adhesive is colored.

8. A method according to claim 2 wherein in the base coating laminate either the layer of polyester film or the layer of heat-sensitive adhesive is colored.

9. A method according to claim 3 wherein in the base coating laminate either the layer of polyester film or the layer of heat-sensitive adhesive is colored.

10. A method according to claim 5 wherein in the base coating laminate either the layer of polyester film or the layer of heat-sensitive adhesive is colored.

11. A method according to claim 1 wherein the base coating laminate includes an additional layer between the adhesive and the polyester, said additional layer being a thin metallic layer or alternatively a colored polymer.

12. A method according to claim 2 wherein the base coating laminate includes an additional layer between the adhesive and the polyester, said additional layer being a thin metallic layer or alternatively a colored polymer.

13. A method according to claim 3 wherein the base coating laminate includes an additional layer between the adhesive and the polyester, said additional layer being a thin metallic layer or alternatively a colored polymer.

14. A method according to claim 5 wherein the base coating laminate includes an additional layer between the adhesive and the polyester, said additional layer being a thin metallic layer or alternatively a colored polymer.

15. A method according to claim 1 wherein the layer of polyester is a polyester selected from the group consisting of polyethylene terephthalate, polyethylene isophthalate and polybutylene terephthalate.

16. A method according to claim 2 wherein the layer of polyester is a polyester selected from the group consisting of polyethylene terephthalate, polyethylene isophthalate and polybutylene terephthalate.

17. A method according to claim 3 wherein the layer of polyester is a polyester selected from the group consisting of polyethylene terephthalate, polyethylene isophthalate and polybutylene terephthalate.

18. A method according to claim 5 wherein the layer of polyester is a polyester selected from the group consisting of polyethylene terephthalate, polyethylene isophthalate and polybutylene terephthalate.

19. A method according to claim 1 wherein the adhesive is a heat-sensitive polyacrylic based adhesive.

20. A method according to claim 2 wherein the adhesive is a heat-sensitive polyacrylic based adhesive.

21. A method according to claim 3 wherein the adhesive is a heat-sensitive polyacrylic based adhesive.

22. A method according to claim 5 wherein the adhesive is a heat-sensitive polyacrylic based adhesive.

23. A method according to claim 1 in which the assembled base coating laminate and carrier paper are heated to a temperature in the range 150° C. to to 200° C. for a period of time in the range 5 to 90 seconds.

24. A method according to claim 2 in which the assembled base coating laminate and carrier paper are heated to a temperature in the range 150° C. to 200° C. for a period of time in the range 5 to 90 seconds.

25. A method according to claim 3 in which the assembled base coating laminate and carrier paper are heated to a temperature in the range 150° C. to 200° C. for a period of time in the range 5 to 90 seconds.

26. A method according to claim 5 in which the assembled base coating laminate and carrier paper are heated to a temperature in the range 150° C. to 200° C. for a period of time in the range 5 to 90 seconds.

* * * * *

UNITED STATES PATENT AND TRADEMARK OFFICE
CERTIFICATE OF CORRECTION

PATENT NO. : 4,715,913

DATED : December 29, 1987

INVENTOR(S) : Nicholas J. Middleton

It is certified that error appears in the above-identified patent and that said Letters Patent is hereby corrected as shown below: On The Title Page:

In the "Heading" under the caption "Foreign Application Priority Data":

"Jun.13,1984 [GB] United Kingdom....... 8316092"

should read:

-- Jun. 13, 1983 [GB] United Kingdom...... 8316092 --.

Signed and Sealed this

Eighteenth Day of October, 1988

*Attest:*

DONALD J. QUIGG

*Attesting Officer*

*Commissioner of Patents and Trademarks*